UNITED STATES PATENT OFFICE.

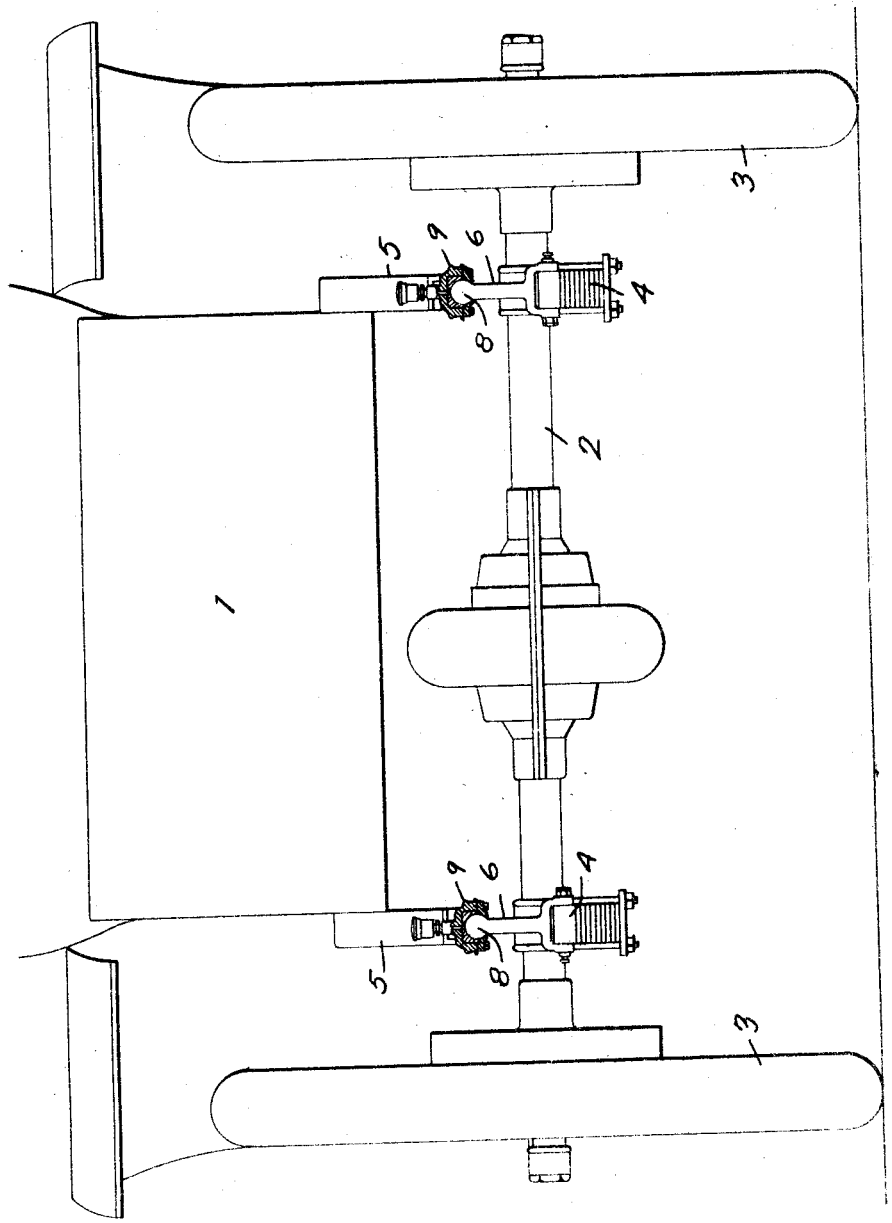

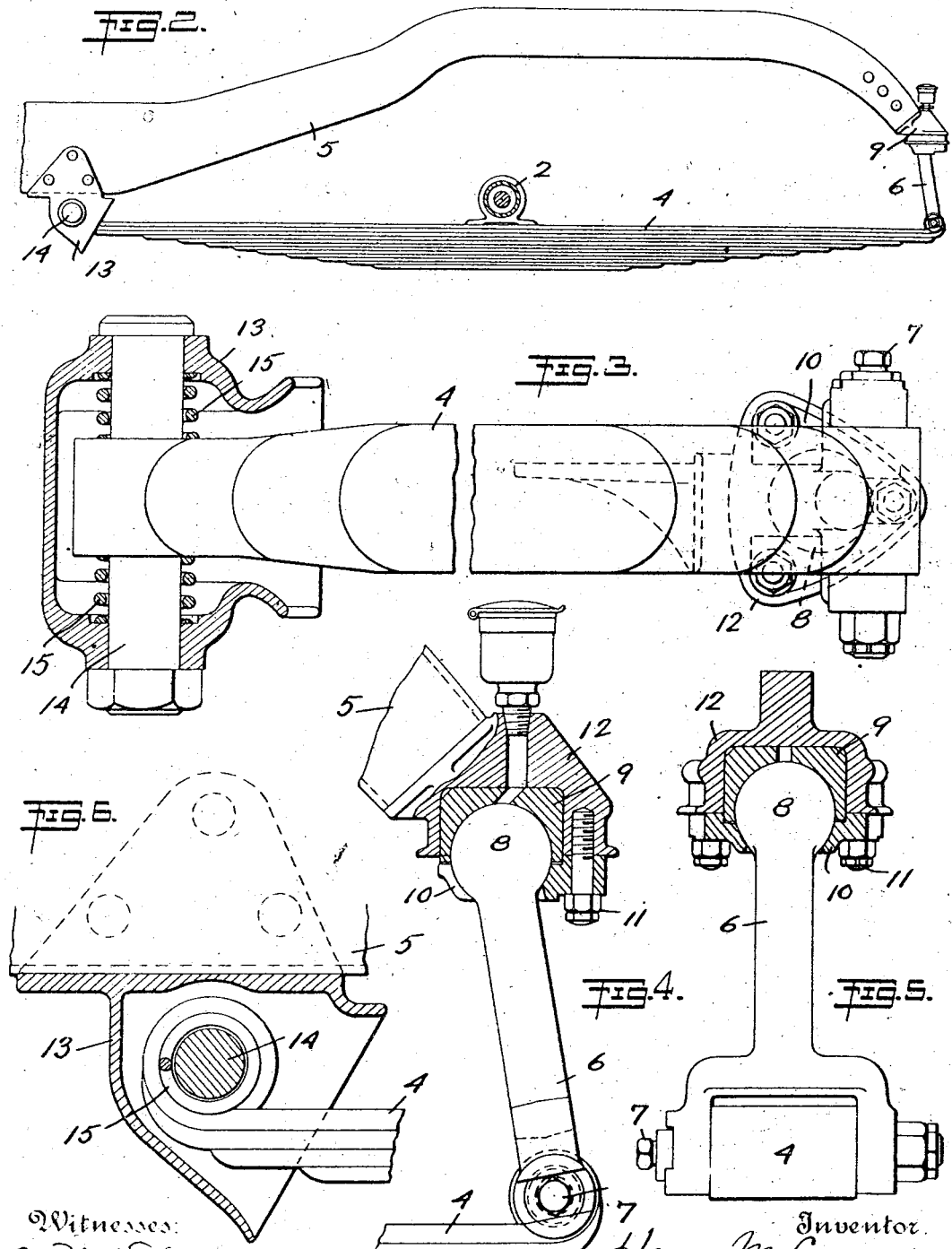

HENRY MIDDLEBROOK CRANE, OF NEW YORK, N. Y.

AUTOMOBILE SPRING SUSPENSION.

1,169,531. Specification of Letters Patent. Patented Jan. 25, 1916.

Application filed August 13, 1915. Serial No. 45,302.

*To all whom it may concern:*

Be it known that I, HENRY MIDDLEBROOK CRANE, a citizen of the United States, residing in the city, county, and State of New York, have invented certain new and useful Improvements in Automobile Spring Suspensions, of which the following is a specification.

In an automobile under certain running conditions there is a tendency for the axle to shift back and forth transversely in reference to the car. In the usual spring suspension, however, such movement is prevented because the body springs, which connect the axle and frame, are fastened rigidly at the middle to the axle, and also, in so far as sidewise movement is concerned, at their ends, where they are held by the spring brackets and links or shackles. The springs being very stiff in transverse direction there is practically no yielding, and the side action consequently brings very severe shocks on the frame. These shocks are very rapid and are very disagreeable to the occupants of the car.

The object of the present invention is to avoid these shocks, due to the tendency of the axle and especially of the rear axle to shift back and forth transversely relatively to the car, and this is accomplished by a construction which provides a degree of governed lateral flexibility, securing freedom from the said shocks but without affecting the security with which the body is supported on the running gear.

A further object is to reduce the inertia of the lateral vibrating portions of the automobile by confining such action substantially to the axle and attached springs. This results in less intense road shocks and a more continuous driving effort, the rear wheels not leaving the road so often.

The improvements comprise a laterally swinging connection between one end of the spring and a frame member or part carried by the frame and a laterally sliding connection between the opposite end of the spring and a frame member, together with resilient means opposing the sliding movement and coöperating with the resistance of the body spring itself to torsion to hold the parts in normal relation and yieldingly to resist lateral displacement.

In the drawings: Figure 1 is a rear elevation of an automobile equipped with the invention, parts being broken away; Fig. 2 is a sectional side elevation showing the essential portions of the invention; Fig. 3 is a considerably enlarged sectional bottom plan view, the body spring having its intermediate portion broken away; Fig. 4 is an enlarged side sectional elevation of the rear portion of Fig. 2; Fig. 5 is a sectional rear elevation of Fig. 4; and Fig. 6 is a sectional side elevation of the portion at the left of Fig. 2.

The drawings represent a car body 1, its rear axle 2, and running wheels 3. The longitudinally extending body springs 4 may be of usual construction, as may also be the longitudinal frame members 5, with which the ends of the body springs are shown as connected. Each of the springs is fastened rigidly at its middle to the axle. At its rear end it is pivotally connected with a link or shackle 6, by means of a transverse bolt 7 passing through the customary eye in the spring. In accordance with the invention the said link is capable not only of longitudinal swinging in accordance with the yielding of the spring to vertical shocks, but may also swing laterally. For this purpose it has a universal joint connection at its upper end, preferably in the form of a ball 8 on the upper end of the link, received in a ball socket 9 having a cap 10, whereby it is held through the instrumentality of screws 11 in a recess in a terminal piece 12 fast on the frame member. The forward end of each spring enters the interior of a hollow bracket 13, which is fixed to the frame member and which carries a pivot bolt 14 passing transversely across its interior, the engaging end of the spring being formed with an eye slidable on this bolt. Helical springs 15 are placed on the pivot at opposite sides of the body spring, between the same and the sides of the bracket. These springs may or may not be under initial compression, and their function is to hold the forward end of the body spring normally centralized and to resist yieldingly and with an increasing force lateral displacement thereof in either direction. In so doing they coöperate with the body spring itself, which is twisted when the link 6 swings laterally. The body spring, it may be noted, is comparatively flexible under torsion, and therefore when acted upon in this manner permits of an appreciable range of lateral movement, which is impossible by any direct lateral bending of the spring. Normally, therefore, the body springs and axles are held sidewise in proper relation to a car frame by means of the resistance of the springs 15 to the sliding of the forward ends of the body springs, and the resistance of the springs themselves to twisting, caused by lateral swinging of the links. In event, however, of any substantial forces tending to produce lateral displacement, the springs 15 yield to the sliding movement of the body springs on their pivots 14, and the body springs themselves yield to the twisting stress, the resistance from these two sources increasing in direct proportion to the transverse movement. The extent of such yieldingly resisted movement is limited by the bottoming of the coils of the springs 15 and by the shanks of the links 6 coming into contact with the sides of the caps 10. The amount of movement thus permitted is sufficient to take care of all ordinary lateral action, and thus prevents any shocks upon the frame unless very severe conditions are encountered. The positive stop in each case prevents the movement from becoming dangerous.

While I have described the preferred embodiment of my invention specifically, it is to be understood that I do not limit myself to the precise construction illustrated, and that variations therein and additions to the substance of the invention are permissible. For example, the connection between the rear end of the spring and the frame, herein represented by a shackle having a ball joint at its upper end, may be of any suitable character and may possess additional functions, provided it permits of the lateral swinging which is characteristic of this portion of the invention.

What I claim as new is:

1. In an automobile, the combination with a frame, an axle, and an interposed longitudinal body spring, of a laterally swinging connection between one end of the spring and the frame, a laterally sliding connection between the opposite end of the spring and the frame, and resilient means opposing transverse movement between the body spring and the frame.

2. In an automobile suspension, the combination with the frame, an axle, and a body spring fastened intermediate its ends to the axle, of a link at one end of the spring jointed to the frame so as to be capable of swinging transversely as well as longitudinally, a connection permitting of relative transverse sliding movement between the other end of the spring and the frame, and resilient means resisting such movement.

3. In an automobile suspension, the combination with a longitudinal frame member, an axle, and a body spring fastened intermediate its ends to the axle, of a link pivotally connected with one end of said spring and having a ball at its upper end, a socket on the end of said frame member receiving said ball, a transversely sliding pivotal connection between the opposite end of the spring and the frame member, and springs resisting sliding movement at said connection.

4. In an automobile suspension, the combination with a longitudinal frame member, an axle, and a body spring fastened intermediate its ends to the axle, of a link pivotally connected with one end of said spring and having a ball at its upper end, a socket on the end of said frame member receiving said ball, a bracket on the frame member adjacent the other end of the spring, a pivot on said bracket slidably receiving the said end of the spring, and springs encircling said pivot at opposite sides of the body spring to resist sliding movement thereof on the pivot.

5. In an automobile suspension, the combination with the frame, an axle, and a body spring fastened intermediate its ends to the axle, of a link pivotally connected to one end of the spring and having a universal joint connection with the frame, a transversely sliding pivotal connection between the opposite end of the spring and the frame, resilient means resisting sliding movement at said connection, and means for limiting the degree of relative transverse movement between the body spring and frame.

6. In an automobile suspension, the combination with the frame, an axle, and a body spring fastened intermediate its ends to the axle, of a link connecting one end of the spring with the frame, a pivot connecting the other end of the spring with the frame and permitting of relative transverse sliding movement, and springs at opposite sides of the pivot connection normally holding the body spring central.

7. In an automobile suspension, the combination with a longitudinal frame member, an axle, and a body spring fastened intermediate its ends to the axle and connected at its opposite ends with the frame member, one end of the spring having a sliding connection with the frame member, the connection at the other end of the frame member comprising a link pivoted to the spring and having a ball at its upper end, and a socket on the frame member receiving said ball.

8. In an automobile, the combination with a frame, an axle, and an interposed longitudinal body spring, of means permitting relative lateral movement between the axle and body spring on the one hand and the frame on the other hand, and resilient means for yieldingly resisting such movement.

9. In an automobile, the combination with a frame, an axle, and an interposed longitudinal body spring, of a laterally swinging connection secured to one end of the spring and permitting lateral motion of the axle with relation to the frame, a laterally sliding connection between the opposite end of the spring and the frame, and resilient means opposing transverse movement between the body spring and the frame.

10. In an automobile, a rear spring suspension, the combination of a frame, two longitudinal springs, means for slidingly securing one end of each of said springs to said frame so as to permit transverse movement of said ends, resilient means for opposing said transverse movement, said springs having at their other ends swinging connections so as to permit lateral motion of the axle with relation to said frame.

11. In an automobile, the combination with a frame, an axle, and an interposed longitudinal body spring, of means permitting relative lateral movement between the axle and body spring on the one hand and the frame on the other hand, resilient means for yieldingly resisting such movement, and means for positively limiting the same.

In testimony whereof, I have signed my name to this specification, in the presence of two subscribing witnesses.

HENRY MIDDLEBROOK CRANE.

Witnesses:
HENRY LECABARDY,
J. HOWARD BREESE.